United States Patent [19]

Cazaillon et al.

[11] Patent Number: 5,273,696
[45] Date of Patent: Dec. 28, 1993

[54] PROCESS OF FORMING A SKI BY INJECTION

[75] Inventors: Jean-Mary Cazaillon, Cran Gevrier; Bernard Chatellard, Veyrier du Lac, both of France

[73] Assignee: Salomon S.A., Annecy Cedex, France

[21] Appl. No.: 607,356

[22] Filed: Oct. 31, 1990

[30] Foreign Application Priority Data

Nov. 22, 1989 [FR] France .................. 89 15665

[51] Int. Cl.[5] .................................... B29C 67/22
[52] U.S. Cl. ..................... 264/45.2; 264/46.6; 264/46.7; 264/257; 264/314
[58] Field of Search ............ 264/45.2, 313, 314, 264/46.6, 46.5, 46.9, 46.7, 257; 280/610; 441/68, 74

[56] References Cited

U.S. PATENT DOCUMENTS

| | | | |
|---|---|---|---|
| 3,478,135 | 11/1969 | Randall | 264/45.2 |
| 3,498,626 | 3/1970 | Sullivan | 280/610 |
| 3,793,415 | 2/1974 | Smith | 264/45.2 |
| 3,816,573 | 6/1974 | Hashimoto et al. | 264/46.5 |
| 3,879,245 | 4/1975 | Fetherston et al. | 264/321 |
| 4,222,808 | 9/1980 | Hale et al. | 264/313 |
| 4,259,274 | 3/1981 | Tiitola | 264/46.5 |
| 4,671,529 | 6/1987 | Le Grand et al. | 280/610 |
| 4,681,725 | 7/1987 | Maruyama | 264/46.5 |
| 4,762,740 | 8/1988 | Johnson et al. | 264/263 |
| 4,891,081 | 1/1990 | Takahashi et al. | 156/78 |

FOREIGN PATENT DOCUMENTS

| | | | |
|---|---|---|---|
| 0017792 | 10/1980 | European Pat. Off. . | |
| 0047038 | 3/1982 | European Pat. Off. . | |
| 0180678 | 5/1986 | European Pat. Off. . | |
| 0226105 | 6/1987 | European Pat. Off. . | |
| 0272359 | 6/1988 | European Pat. Off. . | |
| 0430824 | 6/1991 | European Pat. Off. | 280/610 |
| 1806433 | 8/1969 | Fed. Rep. of Germany . | |
| 1933012 | 1/1971 | Fed. Rep. of Germany . | |
| 3145045 | 5/1983 | Fed. Rep. of Germany | 264/45.2 |
| 3146381 | 6/1983 | Fed. Rep. of Germany | 264/46.8 |
| 2260362 | 9/1975 | France . | |
| 2539693 | 7/1984 | France | 264/46.6 |
| 2654670 | 5/1991 | France . | |
| 54-115931 | 9/1979 | Japan | 280/610 |
| 59-145125 | 8/1984 | Japan . | |

Primary Examiner—Allan R. Kuhns
Attorney, Agent, or Firm—Sandler, Greenblum & Bernstein

[57] ABSTRACT

A ski and a process of forming a ski, including injecting foam within a tubular compartment constituted by a deformable and stretchable membrane made of polyurethane or copolyamide or ABS. During expansion the foam deforms the membrane and presses the elements against the peripheral walls of the ski maintained in the mold.

29 Claims, 3 Drawing Sheets

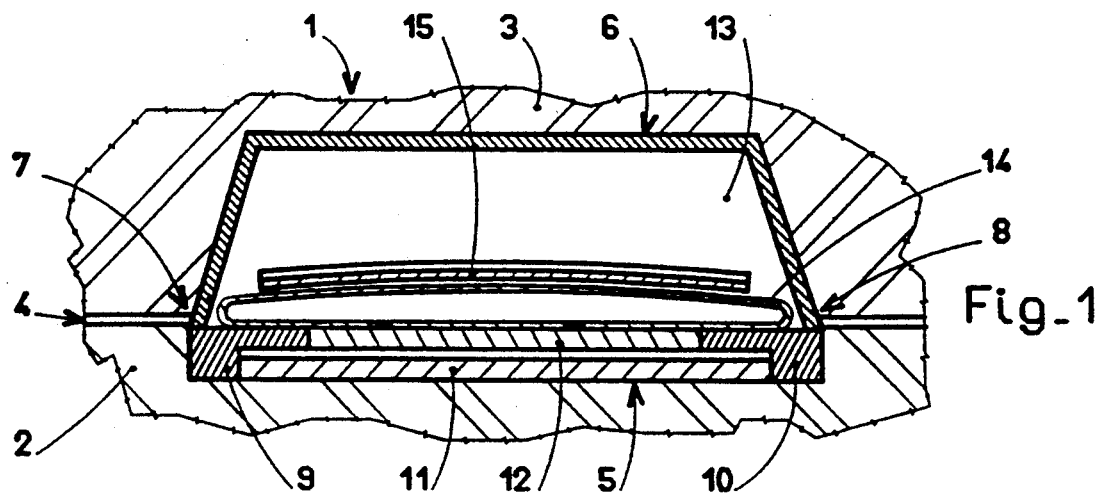
Fig._1
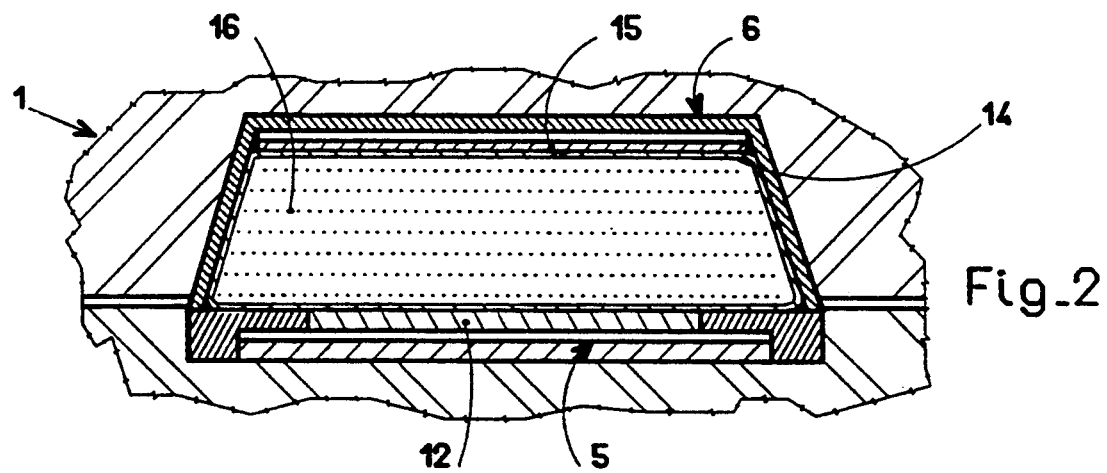
Fig._2
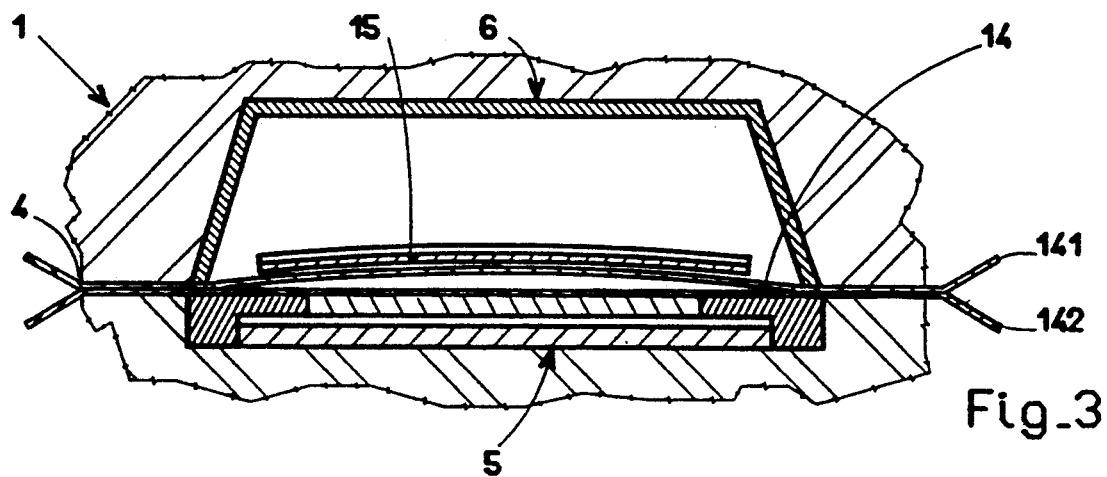
Fig._3

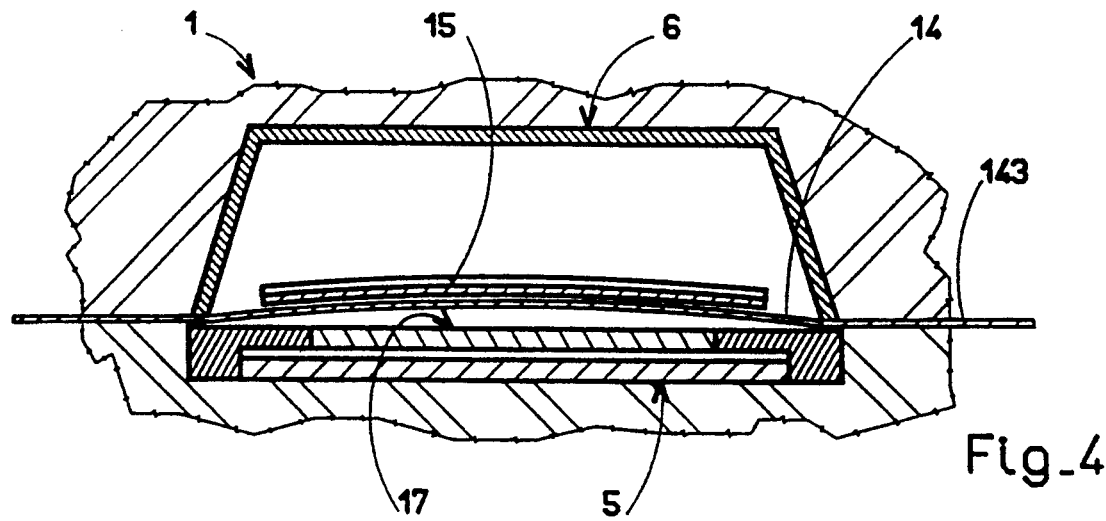
Fig_4
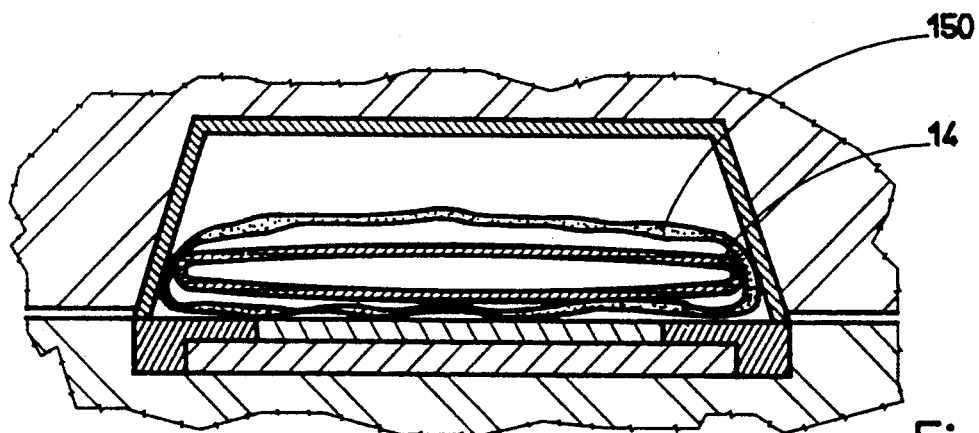
Fig_5
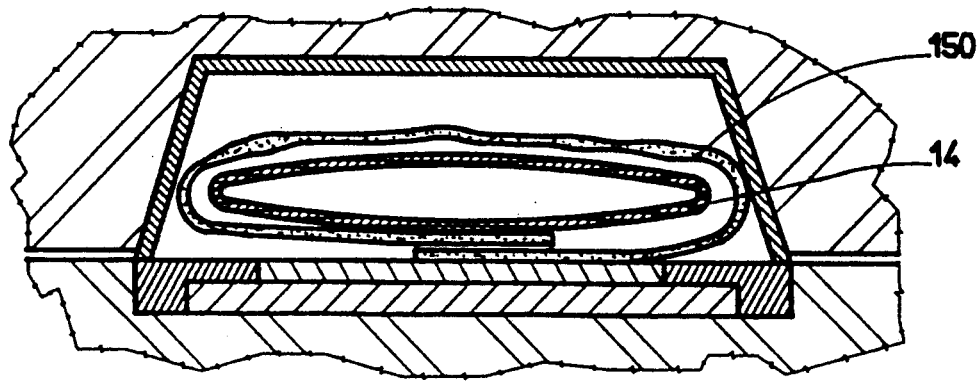
Fig_6

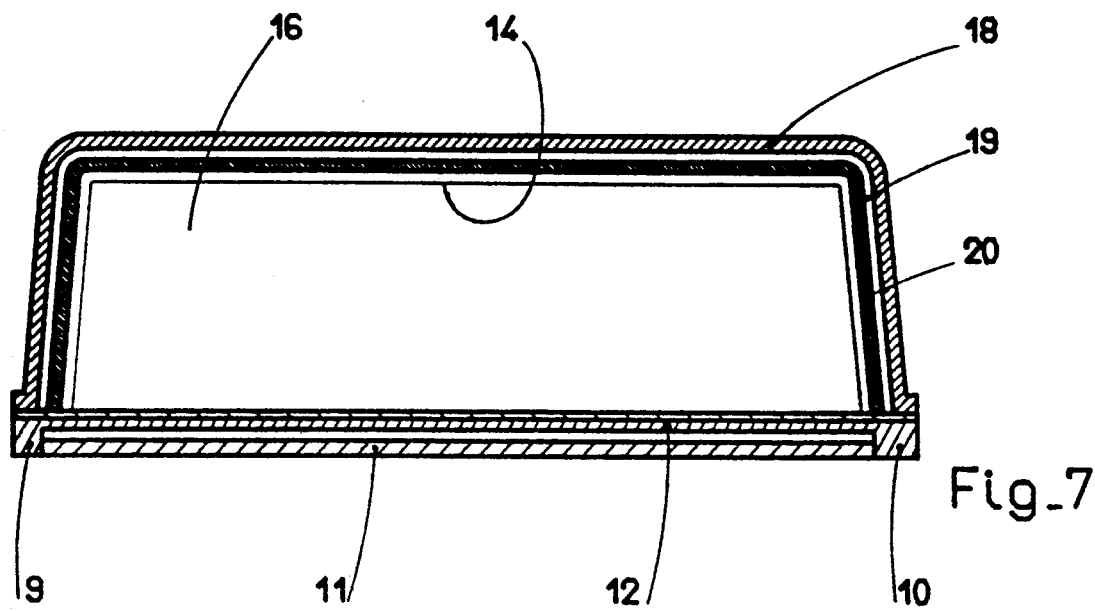
Fig_7
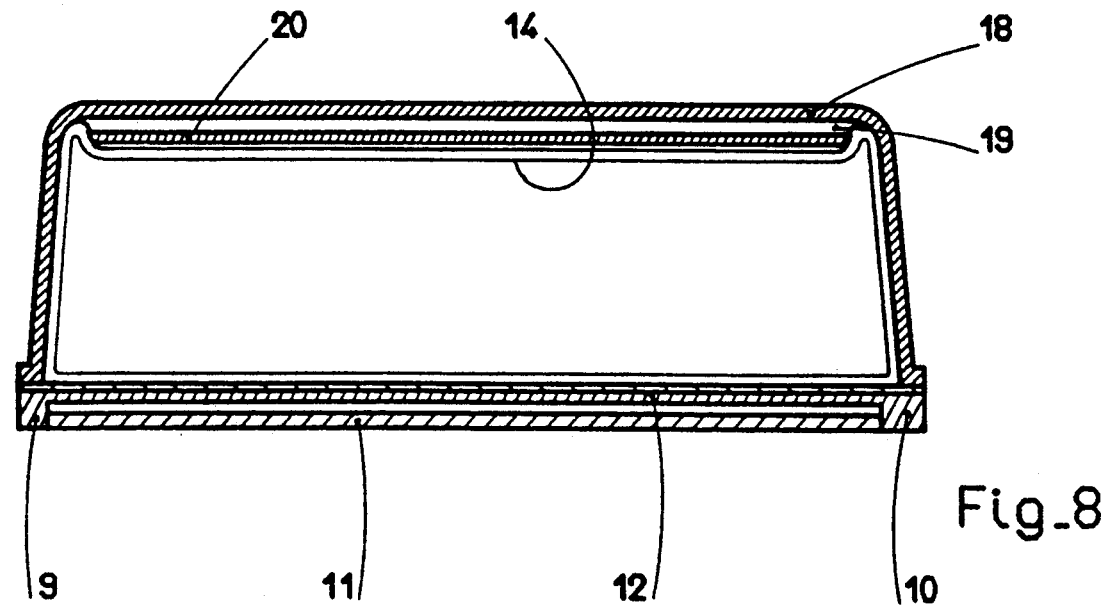
Fig_8

PROCESS OF FORMING A SKI BY INJECTION

BACKGROUND OF THE INVENTION

1. Field of the Invention

The present invention relates to the manufacture of skis utilized in winter sports which are adapted to slide on snow and ice.

2. Description of Background and Relevant Information

Conventional skis generally have a composite structure in which there are combined different materials in a manner such that each of them cooperates in an optimal fashion, taking into account the distribution of mechanical stresses. Thus, the structure generally comprises peripheral protection elements forming the upper and lateral surfaces of the ski, internal resistance elements or resistance plates, comprising a material having a high mechanical resistance and high rigidity. The structure likewise comprises filling elements such as a core of a honeycomb structure, a sliding sole forming the lower surface of the ski and assuring good sliding on the snow, and metallic edges forming the lower corners of the ski.

To obtain the appropriate physical characteristics, the manufacture of modern skis relies upon very diverse materials: sliding soles are generally made out of polyethylene; the honeycomb cores are made out of synthetic foam; the edges are made out of steel; the upper surfaces of the ski are formed out of thermoplastic sheets; the resistance elements are made from metal or fiber reinforced resin.

A ski is subjected to severe mechanical stresses requiring good adherence between the various materials constituting the structure.

In traditional techniques of manufacturing skis by injection one positions within the interior cavity of a mold, between the peripheral walls of the cavity, the peripheral elements of the ski, comprising the upper and lower elements of the ski, and, if necessary, lateral elements. One then injects in the space thus defined by the internal surfaces of the peripheral elements, the constituents of a hardenable foam such as a polyurethane foam or a phenolic foam. After expansion and hardening, the foam assures the assembly of the elements.

One of the substantial difficulties in the process of forming skis by injection resides in the positioning and the maintenance of the peripheral elements of the ski before injection. In particular, one must maintain in place before injection of the foam upper and/or lower mechanical reinforcement fabricated materials of the ski, elements formed out of fibers pre-impregnated with a resin. The fabricated materials must then be preliminarily affixed to the peripheral walls of the ski during a preliminary step or be maintained against the walls, without which the foam may penetrate between the fabricated materials and the wall, and create defects in the structure. The maintenance of the fabricated materials requires providing molds of a particular shape comprising lateral cutouts in which there can be positioned the lateral ends of the fabricated materials. The maintenance of the fabricated materials is not possible in the case where the fabricated materials must be pressed to the bottom of a shell having an inverted U shape, the lateral edges of the fabricated materials not being accessible because they are enclosed by the lateral arms of the U.

During its expansion the foam, is capable of pressing the reinforcement elements against the peripheral walls of the ski. However, this pressing is not generally sufficient and, in the case of fabricated materials made out of pre-impregnated fibrous material, the foam tends to infiltrate between the fibers, while poorly pushing the fabricated materials against the walls. As a result there are defects in adherence between the elements, and a substantial deterioration of the mechanical qualities of the mechanical reinforcement element is thus obtained.

Another difficulty resides in the fact that the hardenable foams have mediocre adherence properties for adhering with a certain number of materials adapted to constitute the structure of the ski, or have certain incompatibilities with these materials. As a result, there are defects in adherence between the core made of hardened foam and the other materials of the ski.

SUMMARY OF THE INVENTION

An object of the present invention, in particular is to avoid the disadvantages of known processes, and proposes a novel process making it possible to form, in a single step, the positioning and assembly of all of the elements by injection, without requiring the lateral maintenance of the fabricated materials of the mechanical resistance elements.

The positioning of the reinforcement elements is thus considerably improved, and one totally avoids the penetration of the hardenable foam within the reinforcement elements and between the reinforcement elements and the peripheral walls.

The process of the invention is easy to perform; the various elements can be easily positioned before injection without particular precautions; and the positioning and injection can be performed in a single operation, which translates into an appreciable saving in time and labor.

The process of the invention furthermore makes it possible, by virtue of this ease of positioning, to multiply, if necessary, the internal elements to be assembled, without having to multiply the maintenance means for these elements.

To attain these objects as well as others, the process of forming a ski according to the invention comprises the step of injecting the constituents of a hardenable foam, of expanding the foam and hardening the hardenable foam, in the interior space defined by the peripheral elements of the ski, the peripheral elements comprising in particular a lower element in the form of a plate, an upper element in the form of a wall, and at least one upper mechanical reinforcement element. According to the invention:

a) before injection, in the interior space a tubular closed compartment which is deformable over at least a portion of the upper wall, or wall facing the upper element of the ski is formed, the compartment being formed of a deformable or stretchable membrane made out of a material having good adherence properties to the hardenable foam and to the peripheral elements;

b) fabricated materials for the upper mechanical reinforcement, formed of at least one textile reinforcement sheet pre-impregnated with a thermosetting or thermoplastic resin, or a metallic reinforcement plate made out of aluminum, for example, are positioned on the upper wall of the tubular compartment;

c) the constituents of the hardenable foam are injected within the tubular compartment whereby, during expansion, the foam contained in the closed tubular compartment pushes and deforms the deformable and stretchable membrane which itself pushes the reinforcement fabricated material and presses it against the internal surface of the upper element, the deformable and stretchable membrane constituting the interface between the upper element and the foam;

d) by heating, gluing between the pre-impregnated elements and the deformable membrane and the deformable and stretchable membrane maintained by the foam is ensured; and e) after gluing, the ski is permitted to cool, after which it is removed from the mold.

According to one embodiment, the tubular compartment is formed by the upper surface of the lower element, and by a membrane in the form of a sheet whose lateral edges are pinched between the lateral edges of the upper element and the lower element; the constituents of hardenable foam are then injected beneath the membrane between the membrane and the lower element.

According to another embodiment, the tubular compartment comprises two membranes in the form of sheets positioned on one another and whose lateral edges are pinched between the lateral edges of the upper element and the lower element. The two membranes constitute an upper wall and a lower wall of the tubular compartment, walls between which are injected the constituents of the hardenable foam.

According to a third embodiment, the tubular compartment is formed of a membrane which is itself tubular that is positioned in the interior space and within which the constituents of the hardenable foam are injected.

The ski of the invention comprises a polymer film positioned at the interface between the cellular foam of the core and at least one of the upper or lower elements, the upper or lower element comprising a mechanical reinforcement element forming the internal surface of the element, a face against which is glued the polymer film.

BRIEF DESCRIPTION OF THE DRAWINGS

Other characteristics, objects and advantages of the present invention will become clear from the non-limiting examples which follow, which can be clearly understood with reference to the text and the annexed drawings in which:

FIGS. 1 and 2 illustrate two principal steps of a process according to the invention in the case of a tubular deformable membrane;

FIG. 3 illustrates an embodiment of the invention in the case of two membranes in the form of sheets;

FIG. 4 illustrates an embodiment of the invention in the case of a tubular element comprising a single membrane in the form of a sheet;

FIG. 5 illustrates an embodiment of the invention in the case of a tubular element comprising a tubular membrane surrounded by a tubular reinforcement fabricated material;

FIG. 6 illustrates another embodiment in the case of a tubular element comprising a tubular membrane surrounded by a reinforcement envelope which does not enclose at the bottom the tubular element but is simply folded;

FIG. 7 is a transverse cross-sectional view of a ski structure according to a first embodiment of the invention; and FIG. 8 is a transverse cross-sectional view of a ski structure according to a second embodiment of the invention.

DESCRIPTION OF PREFERRED EMBODIMENTS

As shown in the Figures, the process of forming a ski according to the invention comprises an injection step in the course of which the peripheral elements of the ski are inserted in a mold 1 which is schematically shown. The mold comprises a lower shell 2 and an upper shell 3 closing at a junction plane 4 and defining an interior cavity. The interior cavity comprises a lower portion in the form of an opening provided in the lower shell 2, and an upper portion in the form of an opening provided in the upper shell 3, whereby the lower cavity of the mold is found on both sides of the junction plane 4.

One positions in mold 1 the peripheral elements of the ski. The peripheral elements of the ski include the elements forming the exterior surfaces of the ski, i.e., the lower surface, the upper surface and the lateral surfaces.

In the embodiment shown, the peripheral elements of the ski comprise a lower element 5 in the form of a plate, an upper element 6 in the form of a wall having an inverted U shape, the lower element 5 and the upper element 6 resting against one another along their lateral edges 7 and 8 substantially in junction plane 4.

Lower element 5 comprises metallic edges 9 and 10, the sliding sole 11 made out of polyethylene, and a lower mechanical reinforcement 12, or lower mechanical resistance plate or blade.

According to a first embodiment, shown in FIGS. 1 and 2, when one inserts the peripheral elements in mold 1, the lower reinforcement 12 can be entirely formed, and constituted for example, by a metallic plate, or a plate made out of resin reinforced with fibers, the resin being entirely polymerized.

Alternatively, according to this embodiment, when one inserts the peripheral elements in the mold, the lower reinforcement 12 can be in the state of a fabricated material of reinforcement, constituted by at least one textile reinforcement sheet pre-impregnated with a wet thermosetting resin or partially reticulated resin or thermoplastic resin, or metallic reinforcement plate in the form of, for example, an alloy of aluminum or steel.

In the present description and in the claims, the expression "textile sheet" includes not only individual sheets of unidirectional parallel threads, but likewise materials made of bi-directional threads, fabrics, grids, braids, veils, non-woven material, and their combinations.

In the interior space 13 defined by the peripheral elements of the ski, one positions in the embodiment of FIG. 1 a deformable and stretchable tubular membrane constituting a closed tubular compartment 14. The tubular membrane is formed out of a material having good adherence properties on the hardenable foam and on the peripheral elements of the ski. The tubular membrane is positioned on the upper surface of the lower element 5. One positions on the upper surface of the tubular membrane an upper mechanical reinforcement fabricated material 15 formed at least of a textile reinforcement sheet pre-impregnated with a wet thermosettable resin or partially cross-linked or thermoplastic resin, or of a metallic reinforcement plate, such as, for example, an alloy of aluminum or steel.

In FIG. 2 one injects within the membrane of the closed tubular compartment 14 the constituents of a hardenable foam such as polyurethane foam or a phenolic foam, to fill the space between the peripheral elements of the ski. During its expansion, the foam 16 pushes and deforms the tubular membrane which itself lifts the reinforcement fabricated material 15 and presses against the internal surface of the upper element 6. The tubular membrane constitutes the interface between the upper element 6 and foam 16. The tubular membrane assures the gluing between the pre-impregnated element such as the fabricated materials 12 and 15, and foam 16.

The hardening reaction of the foam is generally exothermic, and the heat given off causes a heating of the constituent assembly inserted in the mold, and in particular the heating of the textile of the pre-impregnated reinforcement textile sheets, such as the fabricated material 15. In the case of a textile sheet pre-impregnated with a thermoplastic reinforcement resin, the heating favors the gluing of the fabricated material on the upper element 6. In the case of a textile sheet pre-impregnated with a wet thermosetting resin or which is partially cross-linked, the heating causes a completion of the cross-linking of the resin, and the gluing of the fabricated material on the upper element 6 and the membrane of the closed tubular compartment 14.

If necessary, an additional heat source is provided to heat the assembly for a period of time and to a temperature sufficient to assure a cross-linking and complete gluing of the assembly.

After cooling the materials are removed from the mold.

In the embodiment of FIG. 3 the peripheral elements of the ski have the same structure as in the preceding embodiment, the fabricated material 15, likewise, has the same structure. In this case, the closed tubular compartment 14 is formed of two membranes and, formed out of sheets 141 and 142, positioned one on top of the other, of a width greater than the width of space 13 within mold 1, their lateral edges being pinched against one another to assure the lateral sealing of the membranes. Thus, as in the preceding embodiment, the membranes form a closed tubular element 14 in which one can inject the foam 16. The lateral edges of membranes 141 and 142 in the form of sheets are pinched between the lateral edges corresponding to the upper element 6 and the lower element 5 of the ski, and ultimately extend into the junction plane 4 of mold 1.

As in the preceding embodiment, the upper reinforcement 15 and lower reinforcement 12 can both comprise reinforcement fabricated materials constituted by at least one pre-impregnated textile sheet.

During injection and expansion of foam 16, the foam deforms membrane 141 and presses the fabricated material 15 against upper element 6.

In the embodiment of FIG. 4, the tubular compartment 14 is formed by the upper surface 17 of the lower element 5 of the ski and by a membrane 143 in the form of a sheet whose lateral edges are pinched between the corresponding lateral edges of the upper element 6 and the lower element 5 of the ski. The lower reinforcement 12 must preferably already be in its definitive shape and structure, and not in the fabricated material state. The foam is inserted within tubular element 14 and pushes membrane 143 upwardly to press fabricated material 15 against upper element 6.

In the embodiment of FIG. 5, the tubular element 14 is likewise formed of a tubular membrane as in the embodiment FIG. 1, but it is inserted in a mechanical reinforcement element 150 fabricated material which is itself in the form of a closed tube. In FIG. 6, the fabricated material of mechanical reinforcement element 150 is not closed under the tubular element but is simply folded and overlaps at the lower portion. In the two embodiments of FIGS. 5 and 6, during injection of the foam within the tubular element 14, the foam dilates the tubular element 14, which presses the fabricated material 150 evenly against the internal surfaces of the peripheral elements of the ski, thereby constituting a casing structure.

The membranes forming the tubular element 14 are formed out of a film material selected for its adherence properties with, on the one hand, the foam constituting the core and, on the other hand, the walls against which the membrane must be pressed and glued.

One can preferably utilize membranes of polyurethane, or membranes of copolyamide, or ABS (acrylonitrile butadiene styrene). The membranes can have a thickness of several hundredths to several tenths of a millimeter, preferably from 1 to 10 tenths of a millimeter.

The reinforcement fabricated materials 15 in the form of layers as in FIGS. 1, 3 and 4, or in the form of an envelope as in FIG. 5, can be made out of impregnated glass fibers, ZICRAL, steel, carbon, KEVLAR or amorphous metal. The impregnation can be achieved by a wet thermosetting resin or partially cross linked resin selected from the group consisting of polyesters, epoxides, polyurethanes, and phenolic resins.

Alternatively, the impregnation can be achieved by means of a thermoplastic resin selected from the group consisting of polyamides, polycarbonates and polyether imides.

Foam 16 formed in the tubular element 14 can be made of polyurethane foam, or phenolic foam.

In the case of fabricated materials of reinforcement resin which is not entirely cross-polymerized, the polymerization of the resin can occur by external heating and/or by exothermic heat of the polyurethane reaction.

FIGS. 7 and 8 illustrate two ski structures obtained by the process of the invention.

In FIG. 7, the ski comprises on top a thermoplastic material 18 which can be constituted of: polyurethane, polyamide of the P11, P12, P6 or other type, a plastic styrene of the ABS-SAN or other type, a polyolefin of the polyethylene or polypropylene type, a polycarbonate, an acrylic material or a modified polyester. The upper shell comprises, furthermore, a reinforcement 19 and a reinforcement 20 made out of polymerized resin reinforced with fibers, resulting from the polymerization of the fabricated material 15. Membrane 14 forms the interface between the foam 16 and the reinforcement 20. Membrane 14 likewise forms the interface, at the lower portion, with the lower reinforcement 12, itself affixed to the sole 11, and edges 9 and 10. In this embodiment, the two reinforcements 19 and 20 have a transverse cross section having an inverted U shape, and cover the internal surfaces of the upper wall and the lateral walls of the ski.

In the embodiment of FIG. 8, the ski comprises the same top 18 the lower elements 9, 10, 11 and 12. On the other hand, the upper mechanical reinforcement elements 19 and 20 do not border the internal surface of the upper wall of the ski.

Although the invention has been described with reference to particular means, materials and embodiments, it is to be understood that the invention is not limited to particulars disclosed and extends to all equivalents within the scope of the claims.

This application is related to French Application No. 89.15665 whose priority is claimed, the disclosure and drawings of which are hereby incorporated by reference thereto.

What is claimed is:

1. A process of manufacturing a ski having a plurality of peripheral elements, said peripheral elements comprising a lower element having the shape of a plate, an upper element having the shape of a wall, and at least one mechanical reinforcement element, said peripheral elements defining an interior, the process comprising the steps of:
   placing said peripheral elements in a mold;
   injecting constituents of a hardenable foam into said interior;
   expanding and hardening the hardenable foam in said interior;
   forming in the interior, before said step of injecting, a closed, deformable tubular compartment comprising at least one wall, at least one of the at least one wall of said compartment being formed of a deformable and stretchable membrane, made of a material having good adhesion properties on hardenable foam and on the peripheral elements;
   providing on at least one of the at least one wall of the tubular compartment a preformed one of said at least one mechanical reinforcement element;
   injecting the constituents of the hardenable foam inside said tubular compartment such that, during expansion, the foam contained in said tubular compartment deforms and stretches said membrane of the tubular compartment, the tubular compartment pushing back each of said at least one mechanical reinforcement element and positioning said at least one mechanical reinforcement element against an internal surface of at least one of said peripheral elements, said membrane constituting an interface between at least one of said peripheral and mechanical reinforcement elements and the foam;
   heating to ensure adhesion between said at least one mechanical reinforcement element, said peripheral elements and said membrane maintained by said foam;
   after said adhesion, cooling said ski and removing said ski from said mold.

2. Process as defined by claim 1, wherein at least one of said mechanical reinforcement elements is a preformed reinforcement comprising at least one textile reinforcement sheet, preimpregnated with at least one of a thermohardenable resin and a thermoplastic resin.

3. Process as defined by claim 1, wherein at least one of said mechanical reinforcement elements is a preformed reinforcement comprising at least one of (1) at least one metallic plate, and (2) a resin plate having embedded fibers, the resin being entirely polymerized.

4. Process as defined by claim 1, wherein said upper element comprises a wall shaped like an inverted U.

5. Process as defined by claim 1, wherein said tubular compartment comprises a tubular membrane positioned in said interior.

6. Process as defined by claim 1, wherein said lower element comprises a preformed lower mechanical reinforcement, comprising an upper surface of said lower element.

7. Process as defined by claim 5, wherein said tubular membrane is positioned within a preformed mechanical reinforcement element, also having a tubular shape.

8. Process as defined by claim 1, wherein at least one of the at least one wall of said membrane includes a polyurethane film.

9. Process as defined by claim 1, wherein at least one of the at least one wall of said membrane includes an ABS film.

10. Process as defined by claim 1, wherein at least one of the at least one wall of said membrane includes a copolyamide film.

11. Process as defined by claim 1, wherein at least one of the at least one wall includes a multi-layer film.

12. Process as defined by claim 1, wherein at least one of the at least one wall has a thickness between one and ten tenths of a millimeter.

13. Process as defined by claim 2, wherein at least one reinforcement textile sheet is impregnated with a wet or partially cross-linked thermohardenable resin, said resin comprising a member selected from the group consisting of polyesters, epoxies, polyurethanes and phenolic resins.

14. Process as defined by claim 2, wherein at least one reinforcement textile sheet is impregnated with a thermoplastic resin, said resin comprising a member selected from the group consisting of polyamide, polycarbonates, and polyether imides (PEI).

15. Process as defined by claim 13, wherein said at least one reinforcement textile sheet is made of a material comprising a member selected from the group consisting of woven glass, non-woven glass, carbon fibers, and Kevlar fibers.

16. Process as defined by claim 14, wherein at least one reinforcement textile sheet is made of a material selected from the group consisting of woven glass, non-woven glass, carbon fibers, and Kevlar fibers.

17. Process as defined by claim 1, wherein, after said step of injecting, said one of said at least one mechanical reinforcement element is positioned directly adjacent said internal surface of said one of said at least one peripheral elements.

18. A process of manufacturing a ski having a plurality of peripheral elements, said peripheral elements comprising a lower element having the shape of a plate, an upper element having the shape of a wall, and at least one mechanical reinforcement element, said peripheral elements defining an interior, the process comprising the steps of:
   placing said peripheral elements in a mold;
   injecting constituents of a hardenable foam into said interior;
   expanding and hardening the hardenable foam in said interior;
   forming the interior, before said step of injecting, a closed, deformable tubular compartment comprising at least one wall, at least one of the at least one wall of said compartment being formed of a deformable and stretchable membrane, made of a material having good adhesion properties on hardenable foam and on the peripheral elements, wherein said tubular compartment comprises an upper surface of said lower element and a membrane in the form of a film whose lateral edges are pinched between corresponding lateral edges of said upper element and said lower element;

providing on at least one of the at least one wall of the tubular compartment a preformed one of said at least one mechanical reinforcement element;

injecting the constituents of the hardenable foam inside said tubular compartment such that, during expansion, the foam contained in said tubular compartment deforms and stretches said membrane of the tubular compartment, the tubular compartment pushing back each of said at least one mechanical reinforcement element and pressing said at least one mechanical reinforcement element, said membrane constituting an interface between at least one of said peripheral and mechanical reinforcement elements and the foam;

heating to ensure adhesion between said at least one mechanical reinforcement element and said membrane maintained by said foam;

after said adhesion, cooling said ski and removing said ski from said mold.

19. A process of manufacturing a ski having a plurality of peripheral elements, said peripheral elements comprising a lower element having the shape of a plate, an upper element having the shape of a wall, and at least one mechanical reinforcement element, said peripheral elements defining an interior, the process comprising the steps of:

placing said peripheral elements in a mold;

injecting constituents of a hardenable foam into said interior;

expanding and hardening the hardenable foam in said interior;

forming in the interior, before said step of injecting, a closed, deformable tubular compartment comprising at least one wall, at least one of the at least one wall of said compartment being formed of a deformable and stretchable membrane, made of a material having good adhesion properties on hardenable foam and on the peripheral elements, wherein said tubular compartment comprises two membranes in the form of films placed one on top of another, said two membranes having lateral edges pinched between corresponding alteral edges of said upper element and said lower element, said two membranes constituting an upper wall and a lower wall of said tubular compartment;

providing on at least one of the at least one wall of the tubular compartment a preformed one of said at least one mechanical reinforcement element;

injecting the constituents of the hardenable foam inside said tubular compartment such that, during expansion, the foam contained in said tubular compartment deforms and stretches said membrane of the tubular compartment, the tubular compartment pushing back each of said at least one mechanical reinforcement element and pressing said at least one mechanical reinforcement element, said membrane constituting an interface between at least one of said peripheral and mechanical reinforcement elements and the foam;

heating to ensure adhesion between said at least one mechanical reinforcement element and said membrane maintained by said foam;

after said adhesion, cooling said ski and removing said ski from said mold.

20. A process of manufacturing a ski, said process comprising the steps of:

placing a plurality of peripheral elements into a mold, said plurality of peripheral elements defining an interior;

placing an expandable membrane within said interior of said plurality of peripheral elements, said expandable membrane at least partially defining a foam containment area for completely containing the foam within said area; and injecting constituents of a hardenable foam into said foam containment area within said interior of said plurality of peripheral elements, whereby said foam expands said expandable membrane within said interior of said plurality of peripheral elements, whereby said expandable membrane forms an adhesive interface between said hardenable foam and said peripheral elements.

21. Process as defined in claim 20, further comprising, before said step of injecting, the step of placing at least one mechanical reinforcement element within said interior of said plurality of peripheral elements and outside of said foam containment area, whereby during said step of injecting foam into said foam containment area, a force is exerted by expansion of said foam against said at least one mechanical reinforcement element for moving said at least one mechanical reinforcement element to and for securing said at least one mechanical reinforcement element in a final assembled position in said interior of said plurality of peripheral elements.

22. Process as defined by claim 21, wherein at least one mechanical reinforcement element comprises a sheet preimpregnated with one of the group consisting of a thermohardenable resin and a thermoplastic resin, and wherein said process further comprises the step of heating to ensure adhesion at least between said at least one mechanical reinforcement element and said membrane.

23. Process as defined by claim 20, further comprising the step of heating at least during said step of injecting and, after said step of injecting, permitting said ski to cool, said foam to harden and removing said ski from said mold.

24. Process as defined by claim 20, wherein said step of placing an expandable membrane within said interior of said plurality of peripheral elements comprises placing an expandable membrane in the form of a generally closed tubular compartment within said interior of said plurality of peripheral elements.

25. Process as defined by claim 24, further comprising, before said step of injecting, the step of placing at least one mechanical reinforcement element within said interior of said plurality of peripheral elements and outside of said foam containment area, said mechanical reinforcement element having a generally tubular shape surrounding said compartment of said expandable membrane.

26. Process as defined by claim 20, wherein said plurality of peripheral elements comprises an upper element and a lower element, and wherein said step of placing an expandable membrane within said interior of said plurality of peripheral elements comprises placing an expandable membrane in the form of a single film adjacent said lower element, whereby said foam containment area is delimited by said expandable membrane and said lower element.

27. Process as defined by claim 20, wherein said step of placing an expandable membrane within said interior of said plurality of peripheral elements comprises placing an expandable membrane in the form of two films, one adjacent the other, whereby said foam containment area is delimited by said two films.

28. Process as defined by claim 20, wherein said plurality of peripheral elements form an upper wall and opposite lateral walls, said process further comprising placing at least one reinforcement element within said interior of said plurality of peripheral elements and outside of said foam containment area, said at least one reinforcement element comprising an upper reinforcement element positioned between said membrane and said upper wall.

29. Process as defined by claim 28, wherein said upper reinforcement element has a generally U shape, whereby said upper reinforcement element is adjacent interior surfaces of said opposite lateral walls and said upper wall of said plurality of peripheral elements.

* * * * *